Dec. 23, 1924.   1,520,348
J. HOFMANN
SHOCK ABSORBER
Filed May 23, 1923
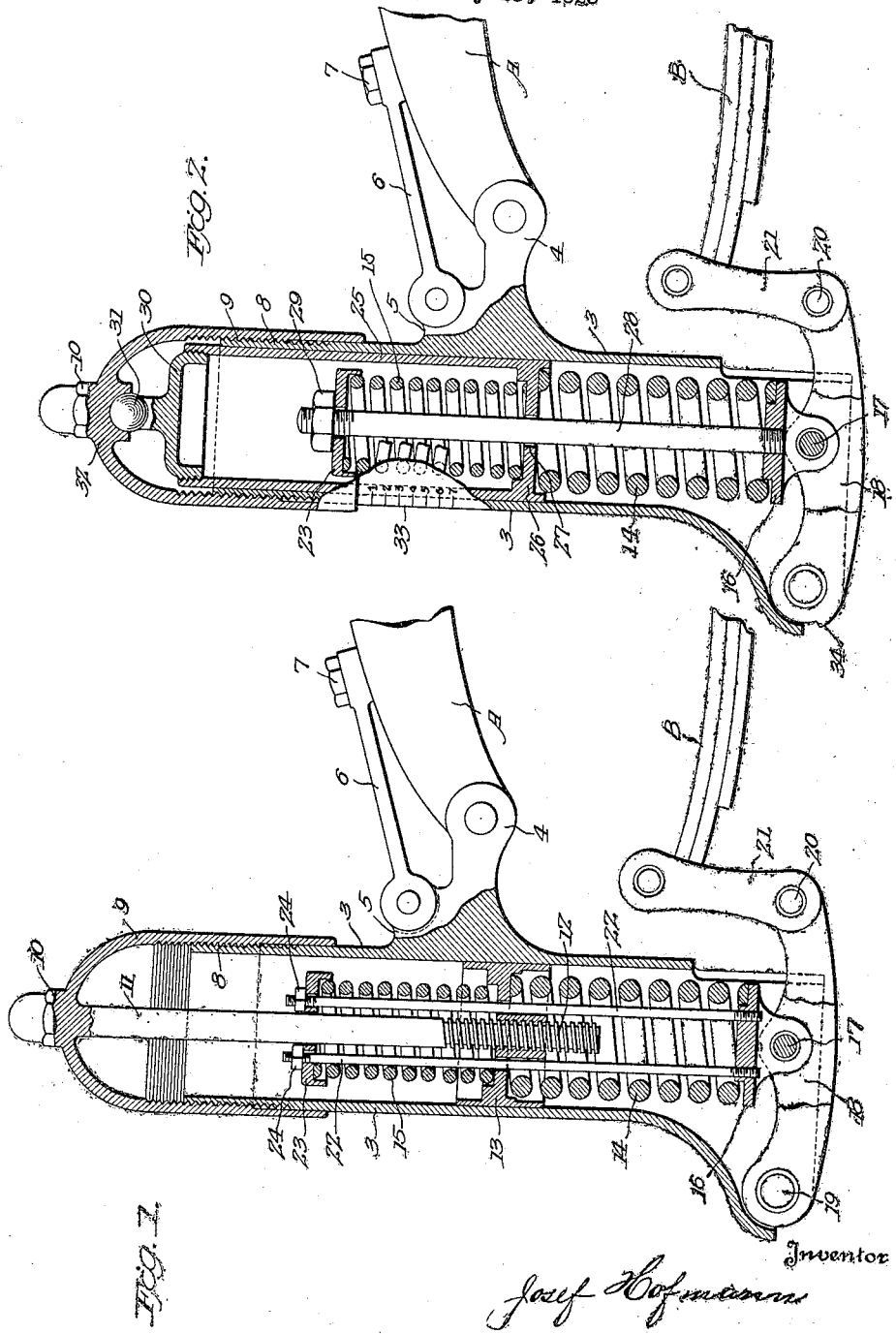
Inventor
Josef Hofmann
By Henry Orth Jr.
Attorney Patented Dec. 23, 1924.

1,520,348

UNITED STATES PATENT OFFICE.

JOSEF HOFMANN, OF BAUMAROCHE, SWITZERLAND.

SHOCK ABSORBER.

Application filed May 23, 1923. Serial No. 640,899.

*To all whom it may concern:*

Be it known that I, JOSEF HOFMANN, a citizen of Poland, residing at Baumaroche, Switzerland, have invented certain new and useful Improvements in Shock Absorbers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to shock absorbers for vehicles, of the type that is included between the body frame extension and the body spring on the running gear on vehicles, said type employing shock-absorbing spring and a spring acting counter to the shock-absorbing spring.

It is well known that coil springs fatigue and become slack. In view of this I have found it of advantage in shock absorbers of the type referred to, to use a shock-absorbing coil spring of somewhat greater strength than is actually required, and compensate this additional strength by means of another, lighter spring, the arrangement being such that upon adjustment the lighter spring will be increased in length and the length of the shock-absorbing spring will be decreased, thereby increasing the strength of the latter spring, to compensate for fatigue or varying loads.

The resistance of the shock-absorbing spring is thus increased by compressing it and making it shorter, and simultaneously releasing the counter-acting spring.

The adjustment is readily made, and it is convenient to adjust the shock absorber according to the load or number of passengers carried.

The construction is simple, and the device is easily attached to a vehicle in the place of the usual shackle.

Referring to the drawings, in which like parts are similarly designated—

Figure 1 is a vertical section of a shock absorber embodying my invention, and

Fig. 2 is a modified construction thereof.

In the drawing A indicates the body frame extension and B the end of a semi-elliptic spring of the vehicle to which the shock absorber is attached.

The shock absorber comprises a tubular casing 3 having thereon an eye 4 for attachment to the body frame extension A and a second eye 5 to which is connected at one end a rod 6 whose other end is bolted at 7 to said extension, the purpose of which rod is to hold the casing 3 upright.

The upper end of the casing 3 is threaded at 8, and on it is a threaded cap 9 provided with a wrench engaging portion 10 on the exterior thereof.

On the interior of the cap 9 is a rod 11 rigidly connected to the cap and turnable therewith. The lower end of this rod is threaded at 12 and carries a normally stationary nut 13 arranged for adjustment in the cylinder 3 and between the adjacent ends of a shock absorbing spring 14 and a lighter counter spring 15, thus forming a partition between the springs.

The lower end of the shock absorbing spring 14 rests on a spring seat 16 pivoted at 17 between the ends of a lever 18.

One end of lever 18 is pivoted at 19 to the casing 3, and the other end is pivoted at 20 to a shackle 21 connected to the vehicle spring B.

Secured in the spring seat 16 are two or more rods 22 for connecting the non-contiguous ends of the springs, which rods are freely slidable with respect to the nut 13. The upper ends of these rods pass through a spring plate 23 forming a seat for the upper end of the lighter spring 15 and are provided with nuts 24 bearing against this plate, by means of which the spring may be initially adjusted, or permanently set for a given load.

The rods 22 preferably pass through the interiors of both springs 14 and 15.

By placing a wrench on the projection 10 and turning the cap 9, the nut 13 is raised or lowered in the cylinder 3, and the main, shock-absorbing spring that carries the load may be lengthened or shortened with a simultaneous inverse adjustment of the smaller counter spring 15, i. e., shortening or lengthening it.

The thread 8 is preferably finer or of less pitch than the thread 12 on rod 11.

Actual construction and operation shows that the pressure of the two springs on nut 13 is sufficient to prevent this nut from turning, so that means for securing this nut to the two springs may be dispensed with, but, obviously, may be used, if desired.

A scale, such as scale 33, Fig. 2, may be used to make adjustments in accordance with the live load on the vehicle, namely for one, two, &c., passengers.

For a long trip such an adjustment is very desirable, as the vehicle rides much easier when balanced according to the load to be carried.

For trucks this is of especial advantage.

In Figure 2 the rod 11 is replaced by a cylinder 25 whose bottom 26 has a central perforation 27 for the passage of a single rod 28 for connecting the non-contiguous ends of the springs together, the lower end of which rod is screwed into the spring seat 16. The upper end of this rod carries a single nut 29 serving the purpose of the several rods 22 and nuts 24, Fig. 1.

The upper end of the cylinder 25 is threaded to receive a cap 30 having a ball-bearing or spherical central lug 31 fitting a seat 32 on the inside of the cap 9. Below the edge of the cap on the outer face of the cylinder is the adjusting scale 33.

By turning the cap 9 the cylinder 25 is moved up or down to move the bottom thereof, 26 forming the spring seat common to both springs, and thereby lengthen or decompress one, and shorten or compress the other, and vice versa.

Either or both forms may have the lever 18, as in Fig. 2, provided with a stop lug 34 that engages the edge of the casing 3 to limit the downward movement of the lever 18.

It is desirable that the two springs 14 and 15 be of different strength, the upper one being the lighter, as it is only a portion of the load on the lower shock-absorbing spring that I desire to compensate, and not the whole load, and in this respect my present invention differs from other constructions. I thereby obtain a shock absorber that gives a very much easier and softer suspension.

I claim—

1. In a shock absorber, a casing, two coil springs therein acting in opposition to one another, an adjustable spring seat normally stationary, and means to adjust said seat from the exterior of the casing to simultaneously compress one spring and de-compress the other and vice versa.

2. In a shock absorber, a casing, two coil springs therein of different strength acting in opposition to one another, an adjustable spring seat normally stationary and means extending exterior of the casing whereby said adjustment may be effected to compress one spring and simultaneously de-compress the other spring and vice versa.

3. In a shock absorber, a casing, two coil springs therein of different strength acting in opposition to one another, an adjustable spring seat normally stationary between the springs and a threaded cap for said casing having means to adjust said seat when the cap is rotated.

4. In a shock absorber, a casing, a heavy load supporting coil spring and a lighter coil spring acting in opposition thereto, an adjustable partition normally stationary between the springs, and means exterior of the casing to adjust said partition.

5. In a shock absorber, a casing having means to attach it to a movable member of a vehicle, a shock absorbing spring and a lighter counter spring in said casing, a partition between said springs, means to adjust said partition within the cylinder and thereby simultaneously alter the length of one spring and inversely alter the length of the other spring, means to connect the opposite ends of said springs, and a lever pivoted to said cylinder and to which said connected springs are pivoted, said lever arranged for attachment to another vehicle member.

6. In a shock absorber, a casing, two coil springs connected together and acting in opposition to one another, adjustable means normally stationary between the springs to simultaneously alter the length of one spring and inversely alter the length of the other spring, and a lever pivoted at one end to said casing and to which said connected springs are pivotally connected.

7. In a shock absorber, a casing, an adjustable partition normally stationary in said casing, a shock absorbing spring below said partition, a lighter counter spring above said partition, means to connect the non-contiguous ends of said springs, a lever pivoted to said casing and means to pivotally connect the connected springs to said lever.

8. In a shock absorber, a casing, an adjustable partition normally stationary in said casing, a shock absorbing spring below said partition, a spring seat for the lower end of said spring, a lighter counter spring above said partition, a spring seat for the upper end of said lighter spring, a rod connection between the spring seats, said connection freely slidable through said partition, a screw cap for said casing, means between the cap and partition to vertically adjust the latter, and a lever pivoted to the lower end of said casing, said first-mentioned spring seat pivoted to said lever.

9. In a shock absorber, a casing, two coil springs therein acting in opposition to one another, a partition between the springs to simultaneously compress one spring and de-compress the other and vice versa, a cap screwed on the exterior of said casing, means connecting said cap and partition, and a scale on the exterior of said casing with which the edge of said cap co-operates.

10. In a shock absorber, a casing, two coil springs therein of different strengths, acting in opposition, means to connect the remote ends of the springs together, a stationary partition between the adjacent ends of said springs, means to adjust said partition, a lever pivoted to the casing having a limit stop arranged to engage the casing, said connecting means pivoted to said lever.

11. In a shock absorber, a tubular casing, a cylinder therein, a screw cap for said casing, a ball bearing between the top of said cylinder and cap, a shock absorbing spring in said casing below said cylinder, a counter spring in said cylinder, seats for the remote ends of said springs, a rod connecting said seats, and a lever pivoted to said casing and to which one of said seats is pivoted.

12. In a shock absorber, a tubular casing, a cylinder therein, a screw cap for said casing, a scale on the casing with which the edge of said cap co-operates, a ball bearing between the top of said cylinder and cap, a shock absorbing spring in said casing below said cylinder, a counter spring in said cylinder, seats for the remote ends of said springs, a rod connecting said seats, and a lever pivoted to said casing and to which one of said seats is pivoted, said lever having a stop lug arranged to engage the casing.

13. In a shock absorber, a casing, a screw cap therefor, two coil springs in said casing acting in opposition to one another, an adjustable spring seat normally stationary between the adjacent ends of said springs and means connecting said cap and seat.

14. In a shock absorber, a casing, a screw cap therefor, two coil springs in said casing acting in opposition to one another, an adjustable spring seat normally stationary between the springs, means to connect said seat and cap, means connecting the springs and movable with respect to said seat, a lever pivoted at one end to said casing, and pivoted between its ends to said spring connecting means.

In testimony that I claim the foregoing as my invention, I have signed my name hereto.

JOSEF HOFMANN.